United States Patent [19]

Jorgensen

[11] Patent Number: 4,496,815
[45] Date of Patent: Jan. 29, 1985

[54] MICROWAVE BROWNING UTENSIL

[75] Inventor: Jorgen A. Jorgensen, Bloomington, Minn.

[73] Assignee: Northland Aluminum Products, Inc., Minneapolis, Minn.

[21] Appl. No.: 458,171

[22] Filed: Jan. 14, 1983

[51] Int. Cl.³ .............................................. H05B 6/64
[52] U.S. Cl. ...................... 219/10.55 E; 219/10.55 F; 99/DIG. 15
[58] Field of Search .................. 219/10.55 E, 10.55 F, 219/10.55 R; 99/DIG. 15

[56] References Cited

U.S. PATENT DOCUMENTS

| 4,266,108 | 5/1981 | Anderson et al. | 219/10.55 E |
| 4,267,420 | 5/1981 | Brastad | 219/10.55 E |
| 4,306,133 | 12/1981 | Levinson | 219/10.55 E |
| 4,362,917 | 12/1982 | Freedman et al. | 219/10.55 E |

FOREIGN PATENT DOCUMENTS 2097639 11/1982 United Kingdom ......... 219/10.55 E

Primary Examiner—Roy N. Envall, Jr.
Assistant Examiner—M. Lateef
Attorney, Agent, or Firm—Orrin M. Haugen; Thomas J. Nikolai; Douglas L. Tschida

[57] ABSTRACT

A utensil for preparing food in a microwave oven. The utensil is provided with a ferritic-silicone coating upon a metal platter, which ferritic coating is covered by a silicone coating to prevent entry of air to the ferrite which would otherwise result in oxidation and degradation of the microwave heating properties of the ferrite. The metal platter rests upon and within a housing made of a material which is highly transmissive of microwaves and having a very low absorbence of microwave energy so that it remains cool. The housing serves to insulate the platter electrically and thermally from its surroundings.

8 Claims, 3 Drawing Figures

MICROWAVE BROWNING UTENSIL

BACKGROUND OF THE INVENTION

This invention relates to a microwave browning or searing utensil. Microwave ovens have become popular for cooking food primarily due to the speed and economy of operation resulting from the microwave energy heating the food product directly. However, since there is no concentration of heat on the outer surfaces of the food product, no browning or searing of the food product occurs. Many consumers consider the lack of browning on food products a drawback. The appearance and taste of microwave oven prepared food products are different, and various attempts have been made to produce browned foods in microwave cooking.

One means of producing browned foods has been to provide utensils which will heat in a microwave environment. The food surface in contact with the heated utensil surface will become hot enough to become crisp and browned much as is the case in cooking with a range. Some of these are massive and require a fairly long time to heat such as microwave absorbing ceramics. Others such as resistive films may heat to higher than desired temperatures and be subject to mechanical failure unless covered by another layer of glass, ceramic or similar material. A film embedded in glass or ceramic, of course, is fairly massive and slow to heat.

The apparatus disclosed in U.S. Pat. No. 3,941,967 to Sumi et al. employs a ferrite ceramic or silicon carbide ceramic with added silicon dioxide or titanium dioxide to lessen the electrical resistance of the ceramic to produce greater heating from the microwave energy in the microwave oven.

U.S. Pat. No. 2,830,162 to Copson discloses cooking vessels made of ferrites in the form of alloys or ceramics.

U.S. Pat. No. 4,266,108 to Anderson et al. discloses use of ferrite adjacent to a microwave reflecting member and wherein the thickness of the ferrite material may be selected to produce a heating element which will heat to a predetermined temperature which is a function of the Curie temperature of the ferrite. The Anderson patent refers to frit, a material used in ceramics and refers directly to ceramic materials. However, there is no further teaching as to how the ferrite material is formed into heating elements.

SUMMARY OF THE INVENTION

The present invention relates to browning utensils made to operate by means of microwave radiation within the cavity of a microwave oven. Specifically, I have been successful in providing a microwave browning utensil which may be used safely and easily in a microwave oven.

An object of the present invention is to provide a microwave browning utensil which will heat in a microwave environment to produce browning or searing of a food product.

Another object of the present invention is to provide a microwave browning utensil which is relatively simple in design and construction.

Still another object of the present invention is to provide a microwave browning utensil which is inexpensive to manufacture.

Yet another object of the present invention is to provide a microwave browning utensil which employs a heating element of a ferrite powder in an organic matrix or a silicone matrix.

A further object of the present invention is to provide a microwave browning utensil which employs a ferrite heating element which is protected from oxidation and degradation.

With these and other objects in view the invention broadly comprises a microwave browning utensil having a microwave transmissive outer housing beneath and around a metal platter the lower surface of which is coated with a layer of ferrite in a silicone matrix.

DESCRIPTION OF THE PREFERRED EMBODIMENT

Figure 1:
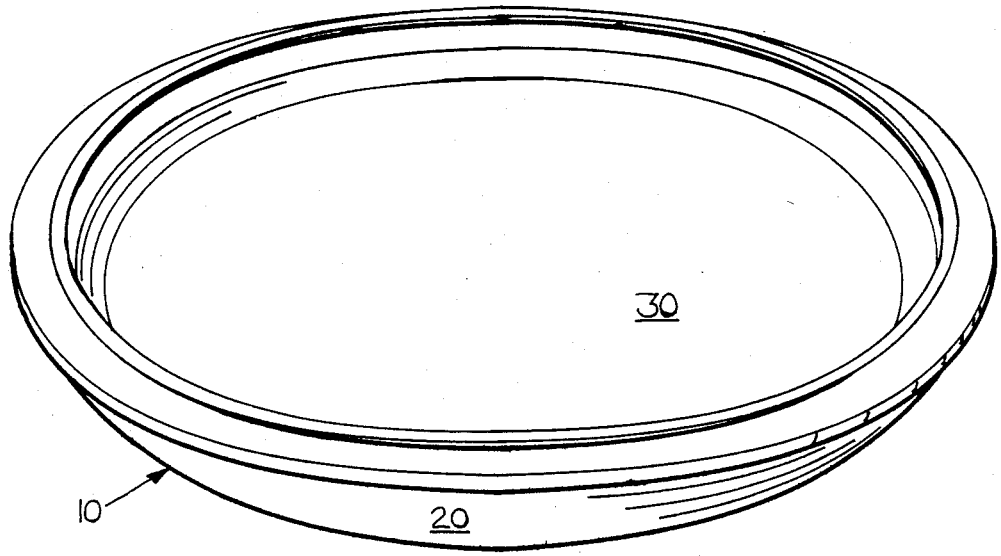
FIG. 1 is a perspective view of a microwave browning utensil of the present invention.
Figure 2:
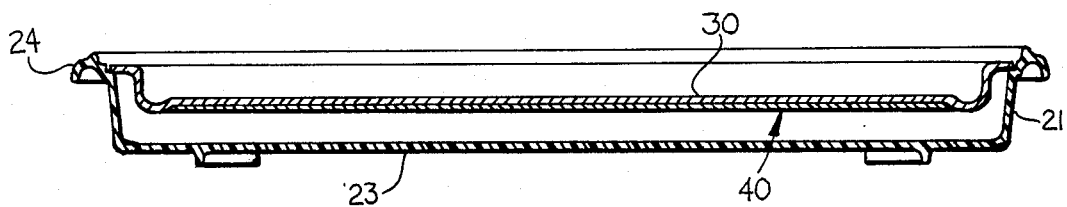
FIG. 2 is a vertical section of the microwave browning utensil taken on a line through the center thereof.

Referring now more particularly to the drawings, reference numerals will be used to denote like parts or structural features in the different views. The numeral 10 denotes generally the microwave browning utensil forming the subject matter of the present invention. It has a generally low cylindrical shape overall and construction thereof will best be understood by reference to FIG. 2. Alternate shapes such as a generally low boxlike shape with square or rectangular horizontal section may be employed as well as the cylinder with circular horizontal section as shown.

The browning utensil 10 has an outer housing 20 which is shown generally cylindrical in shape. Housing 20 serves as a base to hold metal platter 30 in position within itself by means of ledge 22 formed in side wall 21 of housing 20. An outward extension from side wall 21 in the form of a lip 24 enables one using the browning utensil to pick it up easily without touching the hot metal platter 30 or food upon the platter. The bottom 23 of housing 20 serves as a base and together with side wall 21 and lip 24 serve to keep platter 30 spaced away from the walls and bottom of a microwave oven cavity.

Upon the bottom surface of metal platter 30 is the heating element 40. Heating element 40 is formed of a mixture 41 of powdered ferritic material held in a matrix of organic high molecular weight material, preferably silicone. Ferritic material as used herein including the claims shall mean magnetic iron oxide or any ferromagnetic material. Mixture 41 is extremely sticky and is self-adhesive to metal platter 30. Upon the surface of mixture 41 not in contact with metal platter 30, a layer 42 of organic high molecular weight material, preferably silicone, is added.

Layer 42 of silicone or other material overlaps past the edges of mixture 41 and onto the surrounding portion of metal platter 30 so that mixture 41 is sealed off from the atmosphere at the top by metal platter 30 and at the bottom by layer 42 of silicone. The layer 42 of silicone forms a barrier which prevents entry of oxygen and moisture from the atmosphere into mixture 41. This is advantageous in this application because it allows use of ferritic materials which would, especially at elevated operating temperatures, react with atmospheric oxygen and moisture in a reaction which would destroy their desirable magnetic and microwave heating properties, were it not for the silicone layer 42 barrier. This allows use of relatively inexpensive ferritic materials. An example of a suitable material for use as the ferritic component of the ferritic-silicone mixture 41 is $Fe_3O_4$ powder from naturally occurring magnetite as supplied by Indiana General of Valparaiso, Ind., a division of electronic Memories and Magnetics Corporation.

Figure 3:
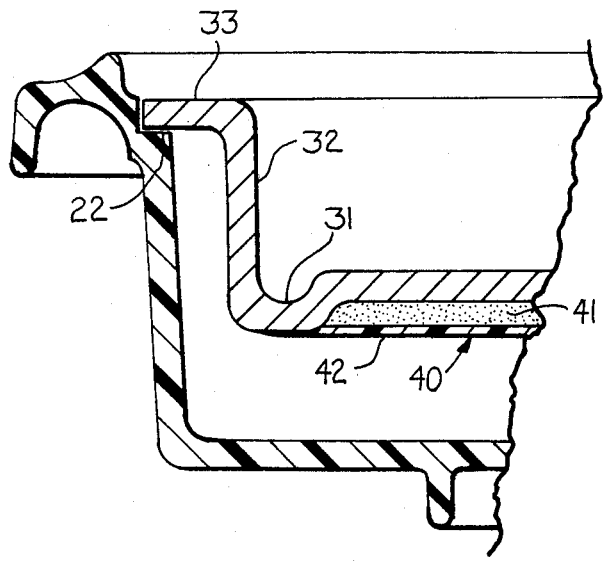
FIG. 3 is a detail of one end of the section of FIG. 2.

The geometry of metal platter 30 and housing 20 are important to the functioning of the browning utensil 10. Metal platter 30 is shown in FIG. 3 with an annular groove 31 surrounded by an upright vertical lip 32 which is in turn surrounded by a horizontal flange 33 all formed into metal platter 30. Side wall 21 of housing 20 is shown vertical and surrounding vertical lip 32 of metal platter 30. Side wall 21 of housing 20 should be spaced approximately one-quarter inch away from upright vertical lip 32 of metal platter 30, with spacing of two-tenths to three-tenths of an inch giving good results. Such a spacing results in enhanced heating of heat element 40 by the microwave energy within the microwave oven.

In addition, the metal platter 30 should be spaced approximately three-quarters inch from the floor of the microwave oven, with spacing of one-half inch to one inch giving acceptable results as to rapid or enhanced heating of heating element 40. At lower locations, insufficient microwave energy penetrates below metal platter 30 and at higher locations too much oven space is wasted.

In use, the browning utensil 10 imparts slight browning to foods placed upon it. Better browning action is obtained by preheating the browning utensil 10 and then adding the food product to be cooked. The initial heat of metal platter 30 sears the food product and then cools somewhat as the food product absorbs microwave energy causing lower heat production by heat element 40.

The invention accordingly economically and effectively carries out the aforementioned objectives.

Having now therefore fully illustrated and described my invention, what I claim to be new and desire to protect by United States Letters Patent is:

1. A cooking utensil for use in a microwave oven environment which comprises a metal platter having a top surface suitable for holding a food product to be cooked and having a bottom surface, a continuous layer of ferritic material of generally uniform thickness bonded to the bottom surface of the metal platter, an air and moisture proof layer of organic material of high molecular weight covering completely the layer of ferritic material and extending therebeyond onto said bottom surface of said metal platter, and a housing of microwave transmissive material extending beneath and to the sides of the metal platter in supporting contact with the platter solely about the periphery of said platter.

2. The subject matter of claim 1 wherein the layer of ferritic material further comprises particles of ferromagnetic material within a matrix of organic material of a high molecular weight.

3. The subject matter of claim 2 wherein the organic high molecular weight material is a silicone material.

4. The subject matter of claim 2 wherein the ferromagnetic material is a magnetic iron oxide.

5. The subject matter of claim 2 wherein the magnetic iron oxide is $Fe_2O_3$.

6. The subject matter of claim 2 wherein the metal platter is generally planar and has a surrounding upwardly extending lip.

7. The subject matter of claim 6 wherein the housing side wall is spaced outwardly from the upwardly extending lip of the metal platter by a distance in the range of between two-tenths inch and three-tenths inch and completely surrounds the peripheral edge of said upwardly extending lip.

8. The subject matter of claim 7 wherein the air and moisture proof layer is spaced upwardly in a non-contact relation from the housing bottom by a distance in the range of between one-half inch and one inch.

* * * * *